United States Patent Office 2,877,124
Patented Mar. 10, 1959

2,877,124
GLASS COMPOSITION

William W. Welsch, Granville, Ohio, assignor to Owens-Corning Fiberglas Corporation, a corporation of Delaware No Drawing. Application November 25, 1955
Serial No. 549,184

10 Claims. (Cl. 106—54)

This invention relates to a glass composition which is especially adapted for the manufacture of glass articles such as fibrous glass and the like.

Fibers have been produced in the past by many methods from various materials including glass, slag, fusible rock, and various other materials. Commercial manufacture of fibers from molten glass has been carried out by introducing the softened material to high velocity gaseous blasts which attenuate the material to fibers. Steam, compressed air, and hot exhaust gases from a combustion burner have been used as the attenuating force in the known processes. Certain other fiber forming processes use centrifugal force for delivering bodies of glass into an angularly shaped gaseous blast which attenuates the glass into very fine fibers.

The centrifugal or rotary process requires glass compositions having particular physical properties which provide a product having high quality at relatively low cost. Briefly, the rotary process referred to comprises delivering into a spinner operating at relatively high speeds the molten material which is to be fiberized. The material is then directed outwardly through openings in the periphery in the spinner as individual bodies which are delivered generally radially of the spinner into the annular blast from a burner or an air manifold. Attenuation of the glass bodies into fine diameter fibers takes place within the blast. A full disclosure of the rotary process appears in U. S. Patent 2,609,566, issued to Slayter and Stalego.

It is an object of this invention to provide glass compositions which have relatively low operating temperatures and yet allow a high fiber production rate to be realized.

It is also an object to provide glass compositions having a low liquidus temperature, a wide range of temperatures at which the glass can be attenuated and a slow rate of devitrification.

It is a further object to provide a glass composition having a low rate of volatilization.

It is an object to provide glass compositions having a relatively low cost and containing no ingredients which produce noxious fumes when the glass composition is melted. It has been discovered that a glass composition comprising silica and certain other glass forming ingredients which remains substantially free of fluorine or other like elements or compounds comprises the following ingredients expressed in weight percent:

| Ingredients: | Proportion |
|---|---|
| $SiO_2$ | 50 to 65 |
| $Al_2O_3$ | 0 to 8 |
| CaO | 3 to 14 |
| MgO | 0 to 10 |
| $Na_2O$, $K_2O$, $Li_2O$ | 10 to 20 |
| $B_2O_3$ | 5 to 15 |
| $TiO_2$ | 0 to 8 |
| $ZrO_2$ | 0 to 8 |
| BaO | 0 to 8 |
| $Fe_2O_3$ | 0 to 12 |
| MnO | 0 to 12 |
| ZnO | 0 to 2 |

A preferred range of proportions expressed in weight percent for the various ingredients in the glass compositions is as follows:

| Ingredients: | Proportion |
|---|---|
| $SiO_2$ | 52 to 64 |
| $Al_2O_3$ | 2 to 5 |
| CaO | 5 to 10 |
| MgO | 2 to 6 |
| $Na_2O$, $K_2O$, $Li_2O$ | 12 to 18 |
| $B_2O_3$ | 6 to 11 |

The following examples are compositions which have been melted and used in rotary fiber forming processes.

Example 1

| Ingredients: | Proportion |
|---|---|
| $SiO_2$ | 58.6 |
| $Al_2O_3$ | 3.0 |
| CaO | 6.1 |
| MgO | 3.2 |
| $Na_2O$ | 14.5 |
| $B_2O_3$ | 9.7 |
| $ZrO_2$ | 4.9 |

Liquidus temperature 1675° F.
Temperature at 1000 poises 1980° F.

Example 2

| Ingredients: | Proportion |
|---|---|
| $SiO_2$ | 53.2 |
| $Al_2O_3$ | 3.0 |
| CaO | 7.7 |
| MgO | 3.7 |
| $Na_2O$ | 13.4 |
| $B_2O_3$ | 6.3 |
| $ZrO_2$ | 3.5 |
| $Fe_2O_3$ | 3.1 |
| $TiO_2$ | 3.1 |
| BaO | 2.9 |

Liquidus temperature 1815° F.
Temperature at 1000 poises 1890° F.

Example 3

| Ingredients: | Proportion |
|---|---|
| $SiO_2$ | 60.8 |
| $Al_2O_3$ | 3.3 |
| CaO | 7.7 |
| MgO | 3.7 |
| $Na_2O$ | 14.5 |
| $B_2O_3$ | 8.6 |
| $K_2O$ | 1.0 |
| $Li_2O$ | 0.5 |

Liquidus temperature 1685° F.
Temperature at 1000 poises 1870° F.

Example 4

| Ingredients: | Proportion |
|---|---|
| $SiO_2$ | 63.8 |
| $Al_2O_3$ | 3.1 |
| CaO | 6.3 |
| MgO | 3.3 |
| $Na_2O$ | 13.6 |
| $B_2O_3$ | 9.9 |

Liquidus temperature 1615° F.
Temperature at 1000 poises 1985° F.

Example 5

| Ingredients: | Proportion |
|---|---|
| $SiO_2$ | 60.04 |
| $Al_2O_3$ | 3.26 |
| CaO | 8.24 |
| MgO | 3.96 |
| $B_2O_3$ | 10.05 |
| $Na_2O$ | 14.31 |
| $Fe_2O_3$ | 0.14 |

Liquidus temperature 1755° F.
Temperature at 1000 poises 1895° F.

Example 6

| Ingredients: | Proportion |
|---|---|
| $SiO_2$ | 58.6 |
| $Al_2O_3$ | 3.2 |
| CaO | 8.8 |
| MgO | 4.2 |
| $Na_2O$ | 15.1 |
| $B_2O_3$ | 10.1 |

Liquidus temperature 1700° F.
Temperature at 1000 poises 1860° F.

This glass composition has been found to be especially adapted for the rotary process and has given excellent results.

The above glass compositions provide a liquidus temperature from about 1600° to about 1800° F. This low liquidus makes it possible to run the glass compositions through glass handling apparatus at relatively low temperatures which preserve the life of the glass handling equipment including the spinners and the like. These glasses have a slow rate of crystal formation and growth. The viscosity of most of these glasses is lower than the conventional glass compositions used formerly in processing fibers attenuated by steam. The durability of these glasses is very good and it has been found that the durability can be improved by including inorganic salts such as aluminum sulfate in the resinous binder used on the fibers. These glass compositions are melted by conventional methods and there is nothing critical in the melting and fining techniques.

Boric oxide is believed to be the essential ingredient in that it maintains suitable chemical durability and decreases the liquidus and viscosity to a marked degree.

Calcium and magnesium oxides are incorporated in order to keep viscosity and costs at a minimum. The glass compositions of this invention are unique in that they are very fluid with low liquidus temperatures and slow nucleation rates but they still contain appreciable amounts of calcium oxide and magnesium oxide. Calcia and magnesia ordinarily cannot be tolerated in low liquidus glasses. It is believed that the calcia and magnesia are essential ingredients in the compositions of this invention.

Titania and zirconia may be used to improve durability, liquidus, viscosity, decrease rate of crystal formation, and so forth. Titania and zirconia, however, are not essential ingredients and if it is desirable to omit these ingredients in order to lower the cost of the glass compositions, this may be done.

Alumina is not believed to be an essential ingredient but it does assist in maintaining suitable durability in the glass. Alumina may be replaced by silica. Addition of alumina or titania, zirconia, and baria helps lower the liquidus temperatures due to complexing of the glass structure.

$Na_2O$ is used as a flux to assist melting and to lower the viscosity and liquidus. It must not be used in excess if durability of the glass is to be maintained. Lithia and/or potassia may partially or wholly replace the soda, if desired. Small amounts of lithia and potassia with the soda tend to improve glass durability.

Iron oxide, manganese oxide, and zinc oxide may be incorporated in these glasses in order to improve durability. Generally they tend to increase the liquidus, however, and are not added except in small amounts.

Fluorine is not an essential ingredient in these glass compositions; however, its incorporation in very minor quantities may be made for the purposes of lowering viscosity and liquidus and in promoting rapid melting and improved durability. Fluorine added as calcium fluoride must not be added in proportions greater than 2% by weight and preferably should be from about 0.3 to 0.5% by weight, if added at all. It has been found that $B_2O_3$ replaces fluorine without loss of the requisite physical properties desired.

The above glass compositions are especially adapted for use in the rotary process where the spinner is preferably operated at a relatively low temperature to reduce to a minimum the erosion and oxidation of the spinner during use. Low operating temperatures are made possible by the glass compositions disclosed with the result that the spinner and other glass handling apparatus have a greater useful life. High fluidity at the liquidus temperature and at the operating temperature is provided by these compositions with the result that very high production rates of high quality fibers is made possible.

Various modifications and variations may be made in the present invention within the spirit and scope of the appended claims.

I claim:

1. A glass consisting essentially by weight:

| | Percent |
|---|---|
| $SiO_2$ | 58.6 |
| $Al_2O_3$ | 3.2 |
| CaO | 8.8 |
| MgO | 4.2 |
| $Na_2O$ | 15.1 |
| $B_2O_3$ | 10.1 |

2. A glass consisting essentially by weight:

| | Percent |
|---|---|
| $SiO_2$ | 63.8 |
| $Al_2O_3$ | 3.1 |
| CaO | 6.3 |
| MgO | 3.3 |
| $Na_2O$ | 13.6 |
| $B_2O_3$ | 9.9 |

3. A glass consisting essentially by weight:

| | Percent |
|---|---|
| $SiO_2$ | 58.6 |
| $Al_2O_3$ | 3.0 |
| CaO | 6.1 |
| MgO | 3.2 |
| $Na_2O$ | 14.5 |
| $B_2O_3$ | 9.7 |
| $ZrO_2$ | 4.9 |

4. A glass consisting essentially by weight:

| | Percent |
|---|---|
| $SiO_2$ | 60.8 |
| $Al_2O_3$ | 3.3 |
| CaO | 7.7 |
| MgO | 3.7 |
| $Na_2O$ | 14.5 |
| $B_2O_3$ | 8.6 |
| $K_2O$ | 1.0 |
| $Li_2O$ | 0.5 |

5. A glass composition consisting essentially by weight:

| | Percent |
|---|---|
| $SiO_2$ | 53.2 |
| $Al_2O_3$ | 3.0 |
| CaO | 7.7 |
| MgO | 3.7 |
| $Na_2O$ | 13.4 |
| $B_2O_3$ | 6.3 |
| $ZrO_2$ | 3.5 |
| $Fe_2O_3$ | 3.1 |
| $TiO_2$ | 3.1 |
| BaO | 2.9 |

6. A glass consisting essentially by weight:

| | Percent |
|---|---|
| $SiO_2$ | 60.04 |
| $Al_2O_3$ | 3.26 |
| CaO | 8.24 |
| MgO | 3.96 |
| $B_2O_3$ | 10.05 |
| $Na_2O$ | 14.31 |
| $Fe_2O_3$ | 0.14 |

7. A glass consisting essentially by weight:

| | Percent |
|---|---|
| $SiO_2$ | 58.8 |
| $Al_2O_3$ | 3.2 |
| CaO | 9.4 |
| MgO | 5.0 |
| $Na_2O$ | 15.2 |
| $B_2O_3$ | 8.0 |
| $Li_2O$ | 0.5 |

8. A glass consisting essentially by weight:

| | Percent |
|---|---|
| $SiO_2$ | 58.5 |
| $Al_2O_3$ | 3.2 |
| CaO | 8.1 |
| MgO | 4.2 |
| $Na_2O$ | 15.1 |
| $B_2O_3$ | 9.0 |
| $K_2O$ | 2.0 |

9. A glass consisting essentially by weight:

| | Percent |
|---|---|
| $SiO_2$ | 57.8 |
| $Al_2O_3$ | 3.1 |
| CaO | 8.6 |
| MgO | 4.1 |
| $Na_2O$ | 14.9 |
| $B_2O_3$ | 8.9 |
| $Fe_2O_3$ | 1.2 |
| $TiO_2$ | 1.2 |

10. A glass composition consisting essentially by weight:

| | Percent |
|---|---|
| $SiO_2$ | 53.2–63.8 |
| $Al_2O_3$ | 3.0–3.3 |
| CaO | 6.1–8.8 |
| MgO | 3.2–4.2 |
| $Na_2O$ | 13.4–15.1 |
| $B_2O_3$ | 6.3–10.1 |

References Cited in the file of this patent

UNITED STATES PATENTS

| | | |
|---|---|---|
| 2,429,432 | Stanworth | Oct. 21, 1947 |
| 2,561,325 | Duncan | July 24, 1951 |
| 2,582,852 | Shoemaker | Jan. 15, 1952 |
| 2,714,558 | Brown et al. | Aug. 2, 1955 |

OTHER REFERENCES

Glastechnische Tabellen (Germany 1932), pp. 689–691 by W. Eitel et al.